Jan. 10, 1933. J. GUTMANN, JR 1,893,890
JACKING APPARATUS
Filed June 7, 1929  2 Sheets-Sheet 1
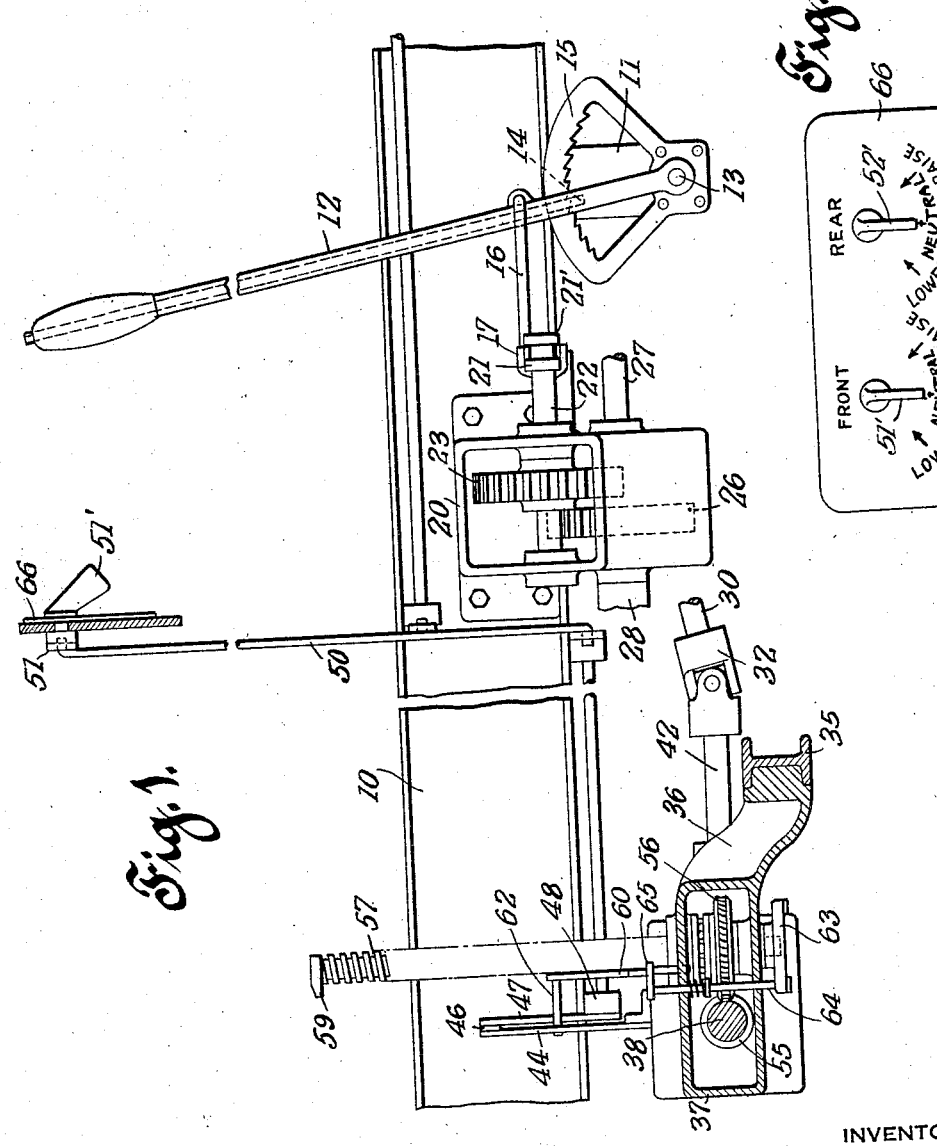
INVENTOR
John Gutmann, Jr.
BY
ATTORNEY Jan. 10, 1933.　　J. GUTMANN, JR　　1,893,890
JACKING APPARATUS
Filed June 7, 1929　　2 Sheets-Sheet 2
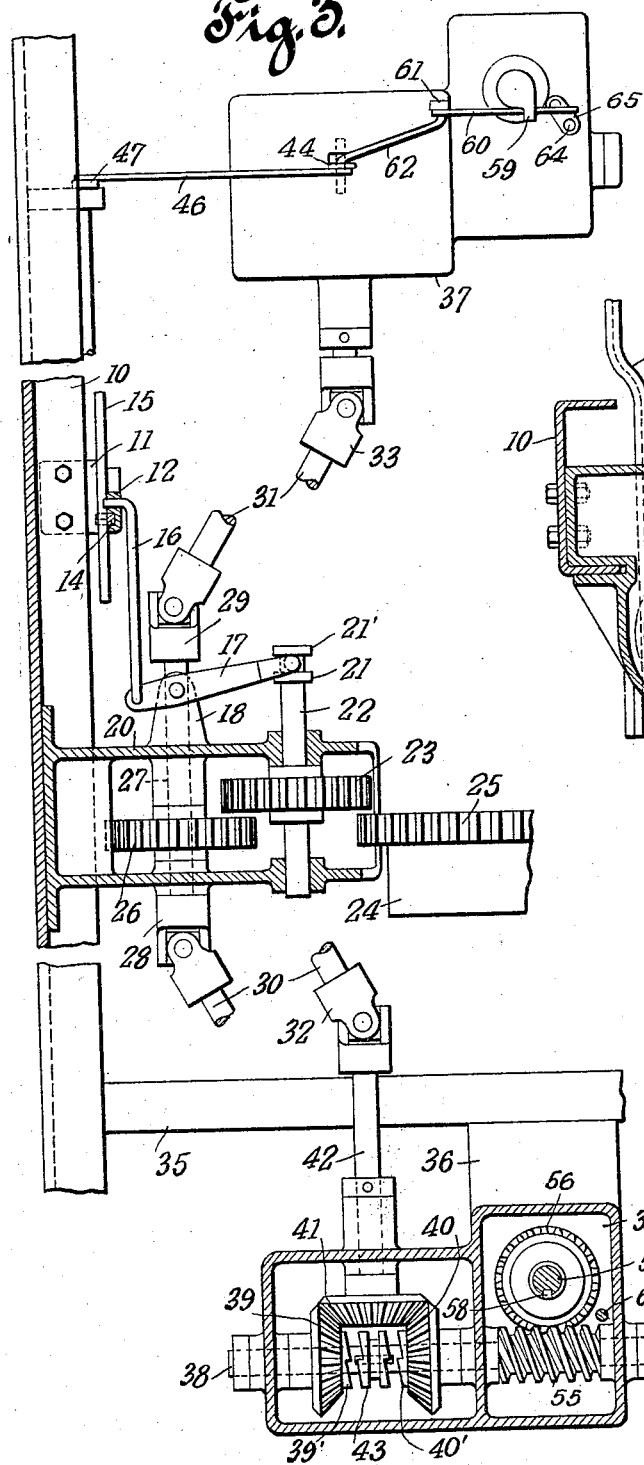
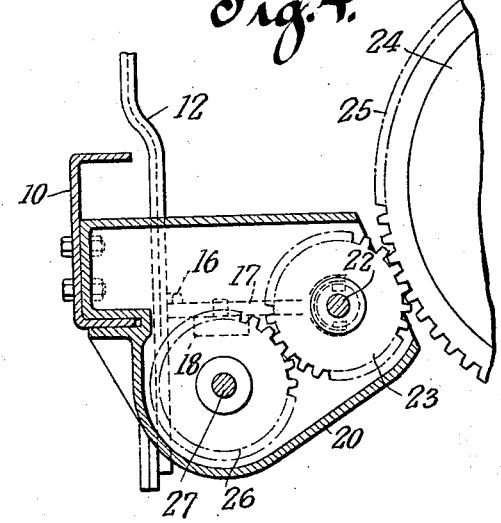
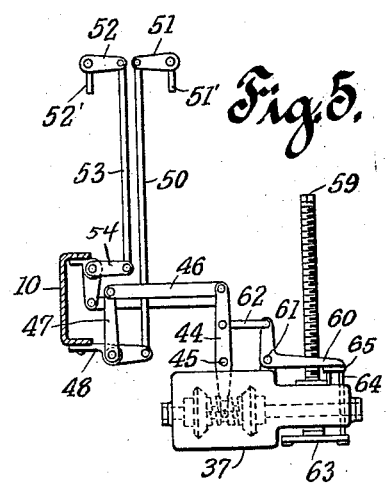
INVENTOR
John Gutmann, Jr.
BY
ATTORNEY Patented Jan. 10, 1933

1,893,890

UNITED STATES PATENT OFFICE

JOHN GUTMANN, JR., OF ST. ALBANS, NEW YORK, ASSIGNOR, BY MESNE ASSIGNMENTS, TO MOTOR JACK CORP., OF NEW YORK, N. Y., A CORPORATION OF NEW YORK

JACKING APPARATUS

Application filed June 7, 1929. Serial No. 369,112.

This invention relates to jacking apparatus, particularly to power operable jacks arranged in operative positions on a motor vehicle for raising and lowering the same.

This invention is an improvement over the kind of apparatus which is disclosed in Letters Patent issued to me bearing No. 1,416,633 patented May 16, 1922, and No. 1,511,122, patented Oct. 7, 1924.

An object of the present invention is to provide a motor vehicle with improved mechanically operated jacks at its front and rear ends and improved means whereby the jacks may be operated selectively or simultaneously in raising or lowering a part of the vehicle or the entire vehicle.

A further feature of the invention is to equip a motor vehicle with mechanically operated jacks at the front and rear preferably located at the centers of the front and rear axles, and means whereby the power to operate the jacks may be derived from the fly wheel of the motor of said vehicle.

A still further object of the invention is to equip a motor vehicle with dash controlled automatic power jacks which are capable of raising and lowering a part of the vehicle or the entire vehicle and means whereby the mechanism for the operating of the jacks may be thrown into a neutral position free of the operation of the motor of the vehicle.

These and other like objects, which will become manifest as the description progresses, are attained by the novel construction and combination of parts hereinafter described and shown in the accompanying drawings, forming a material part of this disclosure, and in which:—

Figure 1 is a partial sectional, partial side elevational view illustrating the combination of elements constituting the present invention.

Figure 2 is a front view of the control lever plate.

Figure 3 is a sectional view showing the driving mechanism of the jacks for obtaining, as well as a top plan view of one of the jacks and its operating mechanism.

Figure 4 is a sectional view of the gear mechanism for obtaining power from the motor fly wheel.

Figure 5 is a front elevational view of the clutch mechanism of the jacks drawn to a decreased scale.

The present apparatus includes two jacks which are identical in construction and operation, having like power transmission units, and similar devices for controlling the power transmission.

The power transmission units are arranged beneath the vehicle and derive power from the fly wheel of the motor. Each unit is connected individually to a jack placed at the front of the vehicle and at the rear of the vehicle and controlled by hand operated levers located within convenient reach of the driver on the instrument board of the vehicle.

Inasmuch as the controlling units, the power transmission units and the jacks are identical in construction and operation, only one of each will be described for the sake of convenience and clearness.

To a beam 10 of the motor vehicle chassis is bolted the flange of a pendant support plate 11, to the lower end of which is pivoted a conventional type of hand operated ratchet lever 12 on a stud 13 having a dog 14 to engage the teeth of a sector 15 bolted to the plate on the axis of stud 13. Extending from the lever 12 is a rod 16 connected to the short arm of a forked lever 17 pivotally mounted on a lug 18 extending from a flanged casing 20 bolted to the beam 10.

The longer forked end of the lever 17 enters between collars 21 and 21' secured to the extending end of a shaft 22 journalled in the casing 20 and having fixed on it a spur gear 23, so that by shifting the hand lever 12 the gear will move from side to side within the casing.

The fly wheel 24 of the motor of the vehicle is provided with teeth 25 on its periphery and the casing 20 is so located with reference to the fly wheel as to permit the gear 23 to engage the fly wheel teeth 25 when the gear is in one position, at which time it will also mesh with the teeth of another gear 26 in the casing 20, the gear being secured on a shaft 27 journalled in the casing and protruding through at both ends.

Power may thus be transmitted from the fly wheel 24 to the shaft 27, on the ends of which are secured universal joint elements 28—29, respectively front and rear, the mating elements being fixed on shafts 30—31, in turn provided with similar universal joint members 32—33 connecting with the drive shafts of the front and rear jacks respectively.

Rigidly secured to the front axle 35 is a bracket 36 supporting a casing 37 in the lower part of which is journalled a horizontal or jack drive shaft 38 on which is rotatably mounted in one portion of the casing, a pair of bevel gears, respectively 39 and 40, meshing with a driving gear 41 fixed on the end of the shaft 42 connected by the universal joints with the shaft 27 and thus driven when the fly wheel is engaged by the shift gear 23.

A collar 43 is slidably keyed to the shaft 38 to move between the gears 39—40, the collar having at its ends clutches to engage with corresponding clutch elements 39'—40' formed on the inner ends of the respective gears.

The collar is also provided with an annular groove to receive the forked end of a shift lever 44, see Figure 5, pivoted at 45, the upper end of the lever being connected by a link 46 with the long vertical arm of a bell-crank lever 47 pivoted to a bracket 48 fastened to the channel support 10.

The short arm of the bell-crank lever is connected by a link 50 with a control lever 51 actuated by the driver, while a similar control lever 52 actuates a link 53, connecting with another bell-crank lever 54, to shift a similar gear control for the rear jack.

In another portion of the casing 37 the shaft 38 is provided with a worm 55 meshed with a worm wheel 56 provided with an internal screw thread to engage a threaded jack stem 57 which is prevented from turning by reason of a key 58 fixed in a part of the casing through which the stem passes.

Carried at the top of the jack stem 57 is a lug 59 adapted, when the jack is moved to its lowermost position, to trip the long arm of a bell-crank lever 60 pivoted at 61, and having its upright short arm connected by a link 62 with the forked shift lever 44, thus disconnecting the clutches transmitting motion to the shaft 38.

At the bottom of the jack stem 57 is a bearing plate 63 to make contact with the ground when raising the vehicle, and slidably mounted in the casing 34 is a rod 64 having a head 65 to contact with the under side of the bell-crank lever 60, when the lower end of the rod is raised by the plate 63, thus disconnecting the clutch from the reverse gear and automatically stopping further action of the jack.

The bearing plate 63 has a certain amount of play relative to the bottom of the jack to allow for any unevenness in the ground in contact with the apparatus.

The levers 51—52 are provided with handles 51'—52' which extend through appropriate openings in a control plate 66 and when either of the handles are directed to raise or lower, the corresponding jacks are caused to operate by the means previously described, subject to the automatic control, which takes place at the extreme limits of their motion only. Although it is preferred to have the device dash controlled, the same may be operated from any other convenient part of the vehicle, such as, for example, the floor or space below the dash board.

I have thus provided positively automatic power jacks which are capable of raising and lowering the front or rear ends of a motor vehicle, or both ends thereof, simultaneously wherein the motive power is derived from the geared portion of the fly wheel; which can be instantly placed in operative positions for facilitating repairs being made to parts under the vehicle, or changing tires; and which can also be used as a brake, especially on a hill, by jacking up either end of the vehicle and thus keep the latter from moving, and which can also be used in case the wheels of the vehicle become stuck in ruts, mud or snow by automatically jacking the vehicle up by the device, sliding a board under the wheels and rolling the vehicle out onto clear ground.

From the foregoing it will be seen that a simple device for the purposes described has been disclosed in the preferred form of its embodiment, but it is not desired to restrict the details to the exact construction shown, it being obvious that changes, not involving the exercise of invention, may be made without conflicting with the scope of the appended claims.

Having thus described the invention, what is claimed as new and desired to secure by Letters Patent, is:—

1. In jacking apparatus for motor vehicles the combination with a chassis, of a casing secured to said chassis, a shift gear mounted in said casing, a peripherally toothed fly-wheel connected to the vehicle motor, a driving gear mounted in said casing, manual means to shift said shift gear to engage with said fly-wheel teeth and said driving gear; a casing secured to an axle of the vehicle, a pair of opposed bevel gears provided with clutch elements rotatably mounted in said latter casing, a connecting gear adapted to mesh with said bevel gears, shafting provided with universal joints, connecting said driving gear with said connecting gear, a collar keyed within said latter casing adapted to move between said bevel gears, said collar being provided with clutch elements to engage and positively drive the corresponding elements of said bevel gears, a pivoted forked shift lever engaging said collar, a bell-crank lever pivotally connected to said chassis, one arm of which being connected to one end of said shift lever, a control lever adapted to be actuated by the operator of the vehicle, said control lever being connected to the other arm of said bell-crank lever, a worm driven by said bevel gears, a worm wheel meshing with said worm, said worm wheel being provided with an internal screw thread, a threaded jack stem engaging with said screw thread, said jack stem being provided with a lug at its top and a bearing plate at its bottom, means to prevent said jack stem from turning, a second bell-crank lever, one arm of which is connected to said shift lever, and the other arm of which is so disposed as to be tripped by said lug when said jack stem is moved to its lowermost position, thereby disconnecting said clutch collar from the engaging bevel gear, and a rod slidably mounted in said latter casing and so disposed with relation to said bearing plate that when said jack stem is moved to its uppermost position, said rod is caused to contact with said bell-crank lever thereby disconnecting said clutch collar from the other of said bevel gears.

2. In jacking apparatus for motor vehicles the combination with a chassis having a beam, of a pendant support plate secured to the beam, a ratchet lever pivoted to said plate and having a dog, a toothed sector secured to said plate, the teeth of which are adapted to engage with said dog, a casing secured to said beam, a forked lever pivotally mounted on said casing, a rod extending from said ratchet lever and connected to one end of said forked lever, a shaft journalled in said casing, a shift gear fixed on said shaft, collars secured to one end of said shaft, the other end of said forked lever being adapted to enter between said collars, so that when the ratchet lever is caused to shift, the said gear will move from side to side within the casing, a peripherally toothed fly-wheel connected to the vehicle motor, a second shaft journalled in said casing, a second gear mounted on said last named shaft, said casing being so located with relation to said fly-wheel as to permit said shift gear to engage said fly-wheel teeth and also mesh with said second gear when said shift gear is in one position, a third shaft jointedly connected to said second shaft, a drive shaft jointedly connected to said third shaft, a casing secured to an axle of the motor vehicle, a horizontal shaft journalled in said latter casing, a pair of opposed bevel gears, provided with clutch elements, rotatably mounted on said horizontal shaft, a driving gear fixed on one end of said drive shaft adapted to mesh with said bevel gears, a collar keyed to said horizontal shaft, adapted to move between said bevel gears, said collar being provided at its ends with clutch elements to engage and positively drive the corresponding clutch elements of said bevel gears, a pivoted forked shift lever engaging said collar, a bell-crank lever pivotally connected to said beam, one arm of which being connected to one end of said shift lever, a control lever adapted to be actuated by the operator of the vehicle, said control lever being connected to the other arm of said bell-crank lever, a worm mounted on said horizontal shaft, a worm wheel meshing with said worm, said worm wheel being provided with an internal screw thread, a threaded jack stem engaging with said screw thread, said jack stem being provided with a lug at its top and a bearing plate at its bottom, means to prevent said jack stem from turning, a second bell-crank lever, one arm of which is connected to said shift lever, and the other arm of which is so disposed as to be tripped by said lug, when said jack stem is moved to its lowermost position, thereby disconnecting said clutch collar from one of said bevel gears, and a rod slidably mounted in said latter casing and so disposed with relation to said bearing plate that when said jack stem is moved to its uppermost position, said rod is caused to contact with said bell-crank lever thereby disconnecting said clutch collar from the other of said bevel gears.

3. Jacking apparatus for a motor vehicle having a fly wheel attached to the motor comprising a jack driving shaft having a worm and a screw jack having a worm wheel in engagement with said worm, means actuated by the motor vehicle whereby power is derived from the fly wheel to rotate said shaft to raise and lower said jack, said means comprising a driving gear, a shift gear for operable engagement with said fly wheel and driving gear, a pair of rotatably opposed gears, a connecting gear adapted to mesh with said opposed gears, said driving gear being connected with said connecting gear, and a member slidably keyed to said jack driving shaft and adapted to engage with either of said opposed gears, selectively; manually operable means to control the movement of said member, and means for automatically causing cessation of rotation of said shaft when the jack reaches the limits of its travel in either direction.

In testimony whereof I have affixed my signature.

JOHN GUTMANN, JR.